United States Patent
Israelsen et al.

(10) Patent No.: US 12,103,344 B2
(45) Date of Patent: Oct. 1, 2024

(54) CONTROL COIL OVER INTERNAL BYPASS DAMPER FOR AUTOMOTIVE SUSPENSIONS

(71) Applicant: AllTech Motorsports Inc., Temecula, CA (US)

(72) Inventors: Wayne E. Israelsen, Menifee, CA (US); Zachary W. Israelsen, Menifee, CA (US)

(73) Assignee: ALLTECH MOTORSPORTS INC., Temecula, CA (US)

( * ) Notice: Subject to any disclaimer, the term of this patent is extended or adjusted under 35 U.S.C. 154(b) by 672 days.

(21) Appl. No.: 17/395,736

(22) Filed: Aug. 6, 2021

(65) Prior Publication Data

US 2023/0041223 A1    Feb. 9, 2023

(51) Int. Cl.
*B60G 13/08*    (2006.01)
*B60G 13/00*    (2006.01)
(Continued)

(52) U.S. Cl.
CPC .......... *B60G 13/08* (2013.01); *B60G 13/003* (2013.01); *B60G 15/067* (2013.01); *B60G 2202/24* (2013.01); *B60G 2202/312* (2013.01); *B60G 2204/128* (2013.01); *B60G 2204/61* (2013.01); *B60G 2204/62* (2013.01); *B60G 2206/41* (2013.01); *B60G 2206/71* (2013.01); *B60G 2206/72* (2013.01); *B60G 2500/104* (2013.01);
(Continued)

(58) Field of Classification Search
CPC .... B60G 13/08; B60G 13/003; B60G 15/067; B60G 2202/24; B60G 2202/312; B60G 2204/128; B60G 2204/61; B60G 2204/62; B60G 2206/41; B60G 2206/71; B60G 2206/72; B60G 2500/104; B60G 2500/201; B60G 2600/20; B60G 2600/21; B60G 2800/162; F16F 9/346; F16F 9/48; F16F 9/3257
See application file for complete search history.

(56) References Cited

U.S. PATENT DOCUMENTS

| | | | | |
|---|---|---|---|---|
| 984,377 | A | * 2/1911 | Kilgour | F16F 9/48 188/287 |
| 3,750,856 | A | * 8/1973 | Kenworthy | F16F 9/44 188/287 |

(Continued)

*Primary Examiner* — Bradley T King
*Assistant Examiner* — James K Hsiao
(74) *Attorney, Agent, or Firm* — Emerson, Thomsonn & Beennett, LLC; Roger D. Emerson (57) ABSTRACT

A damper for use with an automotive coil over shock absorber. An outer damping sleeve is retained over the exterior surface of an inner body and includes a plurality of bypass ports to alternately align and unalign with bypass ports of the inner body to regulate a bypass flow of damping oil between an interior volume and an outer passage, thereby allowing variable damping control of the damper. The outer damping sleeve is connected to an internal floating piston (IFP) which rides inside the inner body. A control spring is retained for applying a force to the IFP to limit the free movement of the IFP and thereby control a damping force of the damper during the damping event. Increased pressure in the hydraulic damping oil causes the IFP to move, causing the bypass ports to open and close depending on the forces subject to the damper.

16 Claims, 8 Drawing Sheets

(51) Int. Cl.
  *B60G 15/06* (2006.01)
  *F16F 9/34* (2006.01)
(52) U.S. Cl.
  CPC .... *B60G 2500/201* (2013.01); *B60G 2600/20* (2013.01); *B60G 2600/21* (2013.01); *B60G 2800/162* (2013.01)

(56) References Cited

U.S. PATENT DOCUMENTS

| | | | | |
|---|---|---|---|---|
| 4,174,098 A * | 11/1979 | Baker | | F16F 9/44 |
| | | | | 267/221 |
| 4,702,355 A * | 10/1987 | Heideman | | F16F 9/003 |
| | | | | 137/625.3 |
| 5,050,712 A * | 9/1991 | Heideman | | F16F 9/516 |
| | | | | 188/315 |
| 5,080,392 A * | 1/1992 | Bazergui | | F16F 9/06 |
| | | | | 280/124.159 |
| 6,296,092 B1 * | 10/2001 | Marking | | F16F 9/0209 |
| | | | | 188/315 |
| 6,883,650 B2 * | 4/2005 | van Wonderen | | F16F 9/462 |
| | | | | 188/287 |
| 7,216,747 B2 | 5/2007 | Breese | | |
| 7,374,028 B2 | 5/2008 | Fox | | |
| 7,621,382 B2 | 11/2009 | Zdeb | | |
| 8,627,932 B2 | 1/2014 | Marking | | |
| 8,672,106 B2 | 3/2014 | Laird et al. | | |
| 8,672,306 B2 * | 3/2014 | Uchiyama | | F16F 9/5126 |
| | | | | 188/282.4 |
| 9,038,791 B2 | 5/2015 | Marking | | |
| 9,222,538 B2 | 12/2015 | Hall | | |
| 9,452,654 B2 | 9/2016 | Ericksen et al. | | |
| 9,556,925 B2 | 1/2017 | Marking | | |
| 10,040,328 B2 * | 8/2018 | Marking | | F16F 9/46 |
| 10,047,817 B2 | 8/2018 | Ericksen et al. | | |
| 10,060,499 B2 | 8/2018 | Ericksen et al. | | |
| 10,094,443 B2 | 10/2018 | Marking | | |
| 10,330,171 B2 | 6/2019 | Cox et al. | | |
| 10,400,847 B2 | 9/2019 | Marking | | |
| 10,415,662 B2 | 9/2019 | Marking | | |
| 10,443,671 B2 | 10/2019 | Marking | | |
| 10,611,203 B1 * | 4/2020 | Rositch | | F16F 9/346 |
| 10,668,975 B2 * | 6/2020 | Walthert | | F16F 9/516 |
| 10,697,514 B2 | 6/2020 | Marking | | |
| 10,718,397 B2 | 7/2020 | Marking | | |
| 10,730,358 B2 * | 8/2020 | Marking | | B60G 15/065 |
| 10,737,546 B2 | 8/2020 | Tong | | |
| 10,821,795 B2 | 11/2020 | Ericksen et al. | | |
| 11,125,298 B2 * | 9/2021 | Dobinson | | F16F 9/19 |
| 2004/0094376 A1 * | 5/2004 | van Wonderen | | F16F 9/467 |
| | | | | 188/287 |
| 2009/0242339 A1 * | 10/2009 | Nakadate | | F16F 9/464 |
| | | | | 188/266.5 |
| 2011/0296981 A1 * | 12/2011 | Chou | | F16F 9/063 |
| | | | | 92/9 |
| 2012/0048665 A1 * | 3/2012 | Marking | | F16F 9/512 |
| | | | | 188/315 |
| 2012/0305350 A1 * | 12/2012 | Ericksen | | B62K 25/06 |
| | | | | 188/269 |
| 2016/0075204 A1 * | 3/2016 | Marking | | F16F 9/067 |
| | | | | 188/269 |
| 2020/0072312 A1 * | 3/2020 | Dobinson | | F16F 9/346 |

\* cited by examiner

CONTROL COIL OVER INTERNAL BYPASS DAMPER FOR AUTOMOTIVE SUSPENSIONS

I. BACKGROUND

A. Technical Field

This invention pertains to the field of automotive suspension systems, particularly coil over shock absorbers.

B. Description of Related Art

In a common-type coil over damper system for a shock absorber, a piston manages rebound and compression in the damper through ports that are covered with flexible steel discs or a flexible metal shim stack that allows the bypass flow in only one direction. These discs or shims can be made in various thicknesses and diameters that allow tuning of the compression and rebound forces by the oil being forced through the piston. The rebound and compression forces are ideally finely tuned to ensure a smooth ride within the vehicle, and the ideal tuning depends on many independent factors, including terrain.

In a known design, a "check shim" style of internal bypass includes flow ports in an inner body are overlaid by spring steel check shims. These check shims only allow flow through the flow ports during a compression event and are closed during a rebound event. This known design allows for bypass flow around the piston at differing positions of travel. However, this known design does not allow for adjustment of bypass characteristics without complete disassembly and modification of flow ports. Additionally, the resistance to flow through these ports provided by the check shims is minimal, and digressive, essentially limiting meaningful adjustment of bypass characteristics to changing the number and size of the flow ports.

II. SUMMARY

The aforementioned problems in the art are overcome by the present damper having a design that allows for immediate adjustment of bypass characteristics external to the damper. This can be accomplished, for example, by adjusting the pressure in a nitrogen spring or via preloading a physical spring. This provides resistance to the opening of the flow ports by the damping spring by progressively increasing resistance to flow as damping events become more severe Provided in this disclosure is a damper for use with an automotive coil over shock absorber. The damper includes an outer body with a body cap that retains hydraulic damping oil within the interior of the damper, where the damping oil is used to absorb energy in the typical manner of shock absorbers. The damper includes a shaft including a piston, which can optionally include shims. An inner body is received and retained within the outer body. The inner body has a smaller cylindrical diameter than that of the outer body and is received within the cylindrical volume of the outer body. The piston travels up and down inside the inner body, which is filled with the damping oil.

The outer damping sleeve is connected via screws to an internal floating piston (IFP), which rides inside the inner body. The internal floating piston is sealed such that there is a chamber on one side filled with nitrogen, or optionally a polymer or steel spring, and the damping hydraulic oil on the other. The screws pass through slots in the inner body, which allow the IFP and, consequently, the damping sleeve, to move in relation to the inner body. Increased pressure in the hydraulic damping oil causes the internal floating piston to move, causing the bypass ports to open and close depending on the forces subject to the damper. The pressure of the nitrogen on the other side of the IFP (or the spring rate of a polymer or steel spring) can be used to adjust the extent to which the bypass ports open and close.

Accordingly, a damper is provided for use with an automotive coil over shock absorber. The damper includes an outer body having a first end and a second end for receiving and retaining damping oil to absorb energy during a damping event. A body cap is provided for enclosing and sealing the first end of the outer body and for attaching to a chassis of a vehicle. A shaft is provided for reciprocating travel. The shaft includes a distal end having an eyelet for attaching to a suspension component of the vehicle. The shaft also includes a proximal end, opposite the distal end, formed as an internal portion of the shaft received within the outer body. A rod guide is retained at the second end of the outer body for containing the damping oil within the damper while allowing the reciprocating travel of the internal portion of the shaft.

An inner body is fixedly retained within the outer body, for receiving the internal portion of the shaft. The inner body includes an interior volume filled with the damping oil for retaining the internal portion of the shaft during the reciprocating travel. The inner body also includes an exterior surface defining an outer passage between the inner body and the outer body. The inner body has a plurality of first bypass ports at predetermined positions around the exterior surface to permit flow of the damping oil between the interior volume and the outer passage in response to the reciprocating travel of the shaft.

An outer damping sleeve is retained over the exterior surface of the inner body and including a plurality of second bypass ports at predetermined positions to alternately align and unalign with the plurality of first bypass ports of the inner body. These bypass ports alternately allow or not allow a bypass flow of the damping oil between the interior volume and the outer passage when aligned, thereby allowing variable damping control of the damper.

An internal floating piston (IFP) is received within the inner body for free movement therein. The IFP is fixedly attached to the outer damping sleeve, and retained proximate to the first end of the outer body adjacent to the body cap. The internal floating piston is configured to move relative to the inner body, to control alignment of the second bypass ports of the outer damping sleeve with the first bypass ports of the inner body dependent on a force applied to the damper during the damping event.

A control spring is retained proximate to the body cap, for applying a force to the internal floating piston to limit the free movement of the internal floating piston and thereby control a damping force of the damper during the damping event. The control spring can include one or more of a steel/metallic spring or a polymer spring.

Alternatively, the control spring can include a nitrogen chamber for receiving pressurized nitrogen gas that functions as an air spring to regulate the damping force. The pressure of the pressurized nitrogen gas is externally adjustable to selectively vary a spring constant within the nitrogen chamber. A check valve can be provided in the body cap between the nitrogen chamber and a flow passage for supplying the pressurized nitrogen gas. The check valve can include a check ball that is forced into a seat upon movement of the internal floating piston, thereby increasing a rate of pressure buildup in the nitrogen chamber during a damping event.

A reservoir bridge fluidly connects to the outer passage for allowing damping oil displaced by the shaft to flow into a reservoir through a passage connected thereto, such that damping oil flows in and out of the outer passage through the reservoir bridge.

The outer body, inner body, outer damping sleeve and outer passage are substantially cylindrical and concentric. The inner body has a smaller cylindrical diameter than that of the outer body so as to be received within a cylindrical volume of the outer body. The interior volume of the inner body is a cylinder. The inner body is formed of a cylindrical tubular member that is fixedly mounted between the rod guide and the body cap in order to prevent free movement during damper operation.

The internal portion of the shaft includes a wear band to provide a seal to the interior surface of the inner body during the reciprocating travel. The rod guide comprises an O-ring and a flange seal. The internal floating piston and the outer damping sleeve are connected with one or more screws. The inner body also includes one or more channels to respectively allow reciprocal movement of the one or more screws within the inner body and thereby allow movement of the internal floating piston and the outer damping sleeve together.

According to an aspect, the present invention provides effective control of oil pressure within an automotive damper system.

According to another aspect, the present invention adjusts the damping characteristics of an automotive damper system.

According to another aspect, the present invention provides a bypass without check shims or plates.

According to another aspect, the present invention allows for instant external adjustment of the damping characteristics of the damper system via adjusting the spring rate of the control adjuster spring (i.e., changing nitrogen pressure, spring preload, etc.).

Other benefits and advantages of this invention will become apparent to those skilled in the art to which it pertains upon reading and understanding of the following detailed specification.

III. BRIEF DESCRIPTION OF THE DRAWINGS

The disclosed damper may take physical form in certain parts and arrangement of parts, embodiments of which will be described in detail in this specification and illustrated in the accompanying drawings which form a part hereof and wherein.

IV. DETAILED DESCRIPTION

Referring now to the drawings wherein the showings are for purposes of illustrating embodiments of the article only and not for purposes of limiting the same, and wherein like reference numerals are understood to refer to like components:

As shown in FIGS. 1, 2, 3, and 4, a damper 10 is depicted for use with an automotive coil over shock absorber. The damper 10 includes an outer body 12 that can be threaded to receive a coil spring and associated spring adjusting hardware (not shown). The outer body 12 has a body cap 14 including an opening 16 that receives a spherical bearing (not shown) to attach to the chassis. The body cap 14 also includes an O-ring seal 18 to contain hydraulic damping oil within the interior of the damper 10, where the damping oil absorbs energy in the typical manner of shock absorbers. The damper 10 also includes a shaft 20 that is received within the outer body 12. The shaft 20 includes a distal end having an eyelet 22 to attach to the suspension component. The shaft 20 also includes proximal end, opposite the distal end with the eyelet 22, where the proximal end is formed as an internal portion 24 of the shaft 20 received within the outer body 12.

Figure 1:
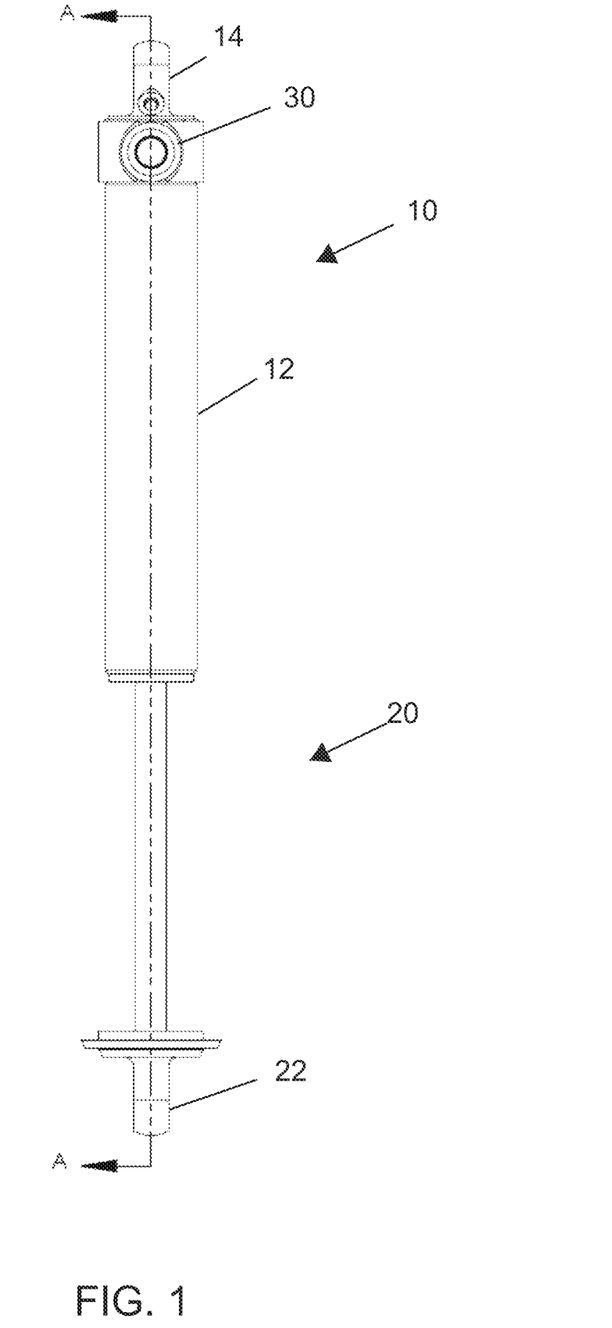
FIG. 1 is a side view of a damper for an automotive coil over shock absorber in accordance with an exemplary embodiment of the present invention.
Figure 2:
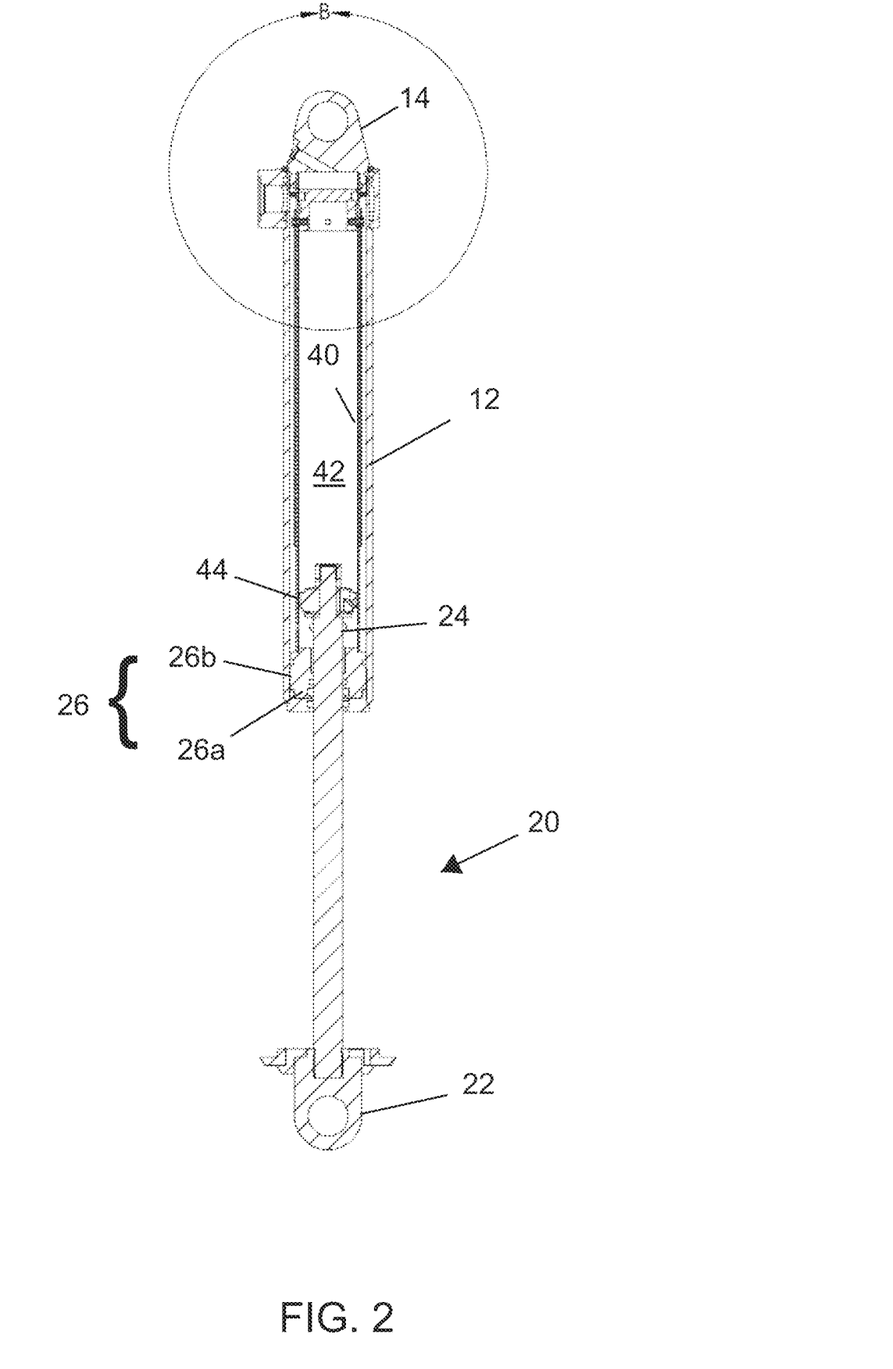
FIG. 2 is a front cross-sectional view of the damper for an automotive coil over shock absorber of FIG. 1, taken along the line A-A, in accordance with an exemplary embodiment of the present invention.

As particularly shown in FIG. 2, the internal portion 24 of the shaft 20 includes a rod guide 26 in the form of an O-ring 26a and a flange seal 26b to contain damping oil within the damper 10 while allowing the internal portion 24 to pass through and cycle through the reciprocating motion of its travel. As mentioned hereinabove, in known system, a piston has rebound and compression through ports that are covered with flexible steel discs. Such discs can be made in various thicknesses and diameters that allow tuning of the compression and rebound forces by the oil being forced through the piston. Such discs can be optionally employed with the present system.

Figure 3:
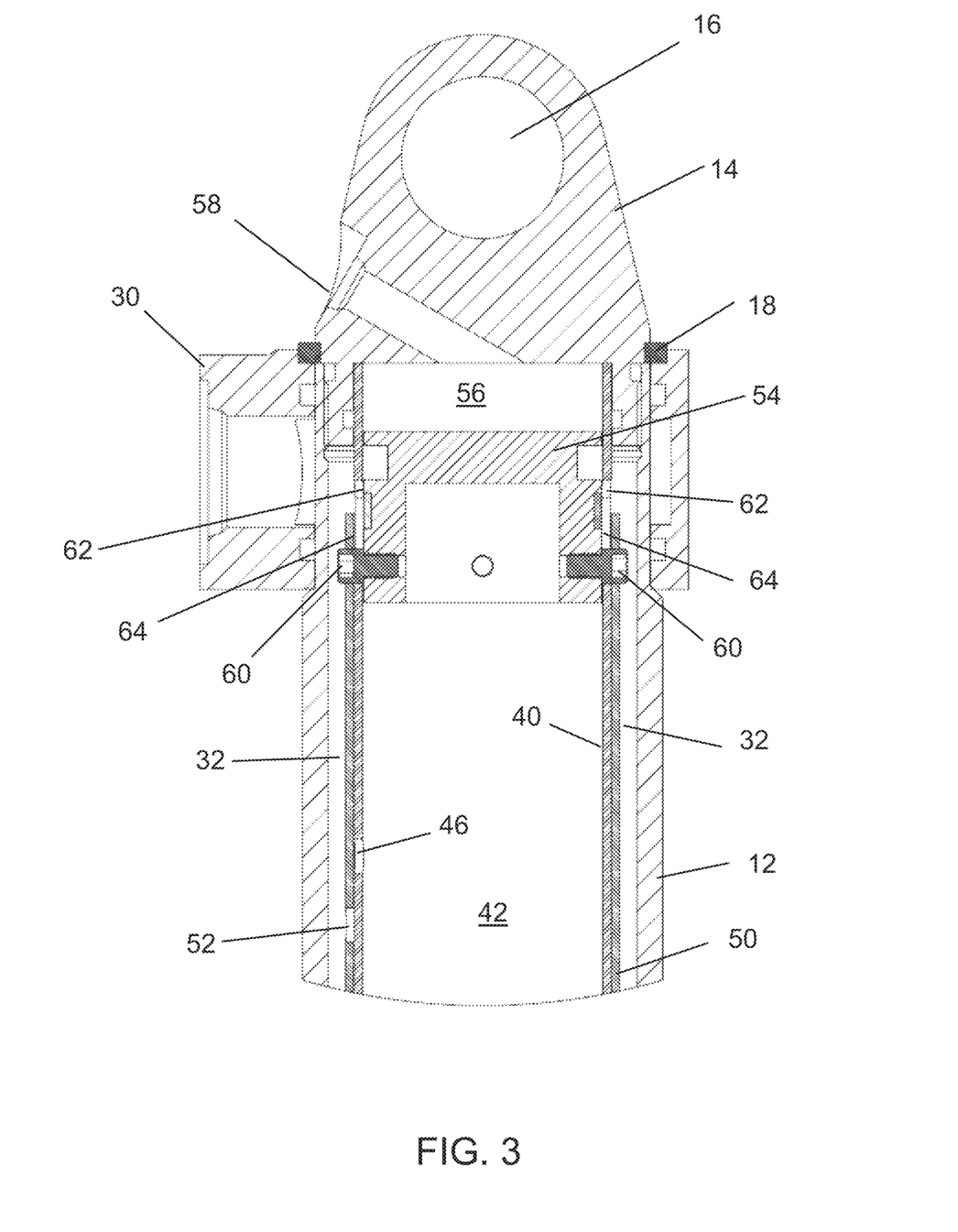
FIG. 3 is a detail view of the front cross-sectional view of the damper for an automotive coil over shock absorber of FIG. 2, shown within the circle B, in accordance with an exemplary embodiment of the present invention.
Figure 4:
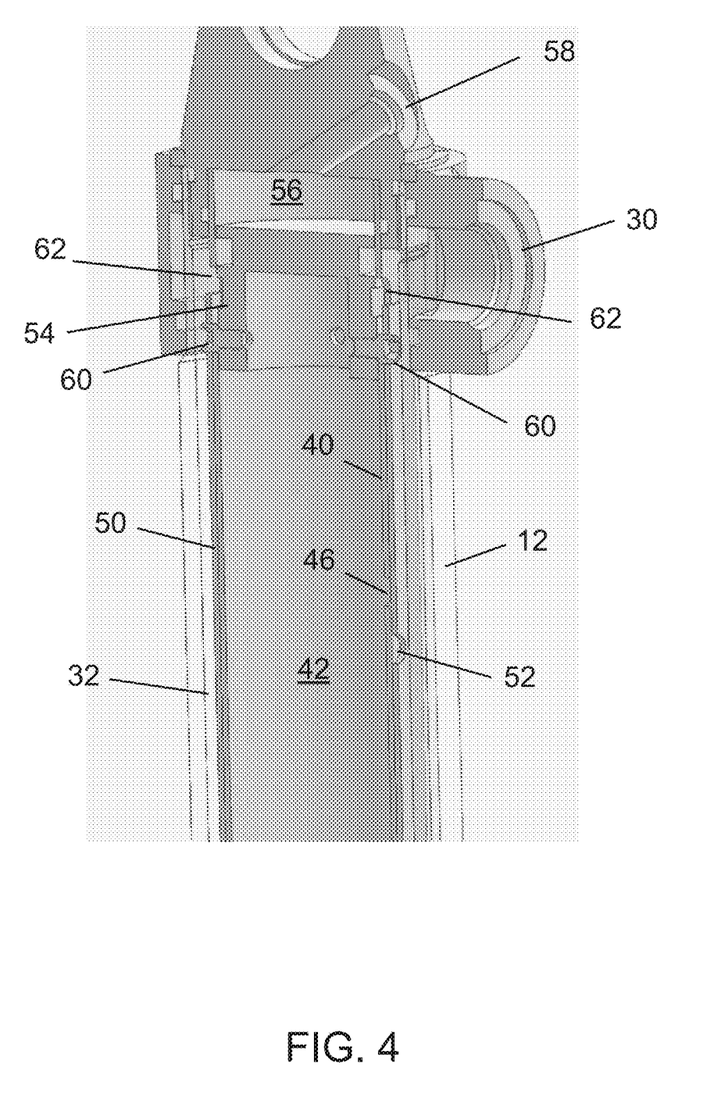
FIG. 4 is an oblique perspective view of the detail view of the damper for an automotive coil over shock absorber of FIG. 3 in accordance with an exemplary embodiment of the present invention.
Figure 5:
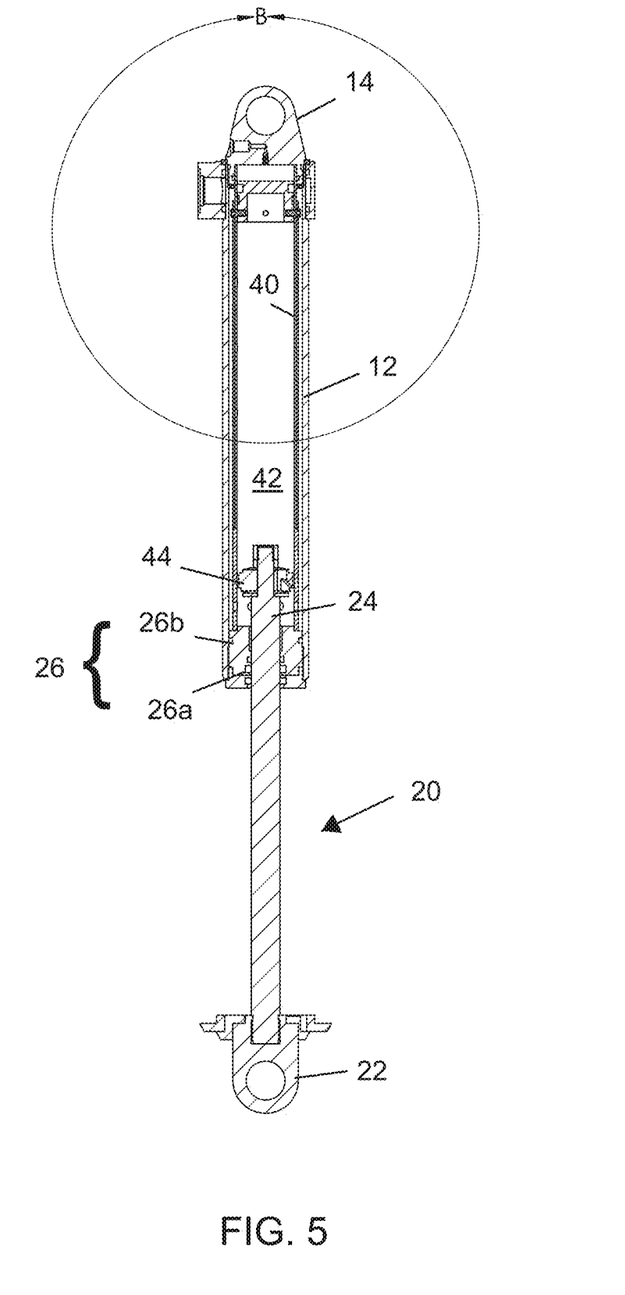
FIG. 5 is a front cross-sectional view of an alternative embodiment of the damper.
Figure 7:
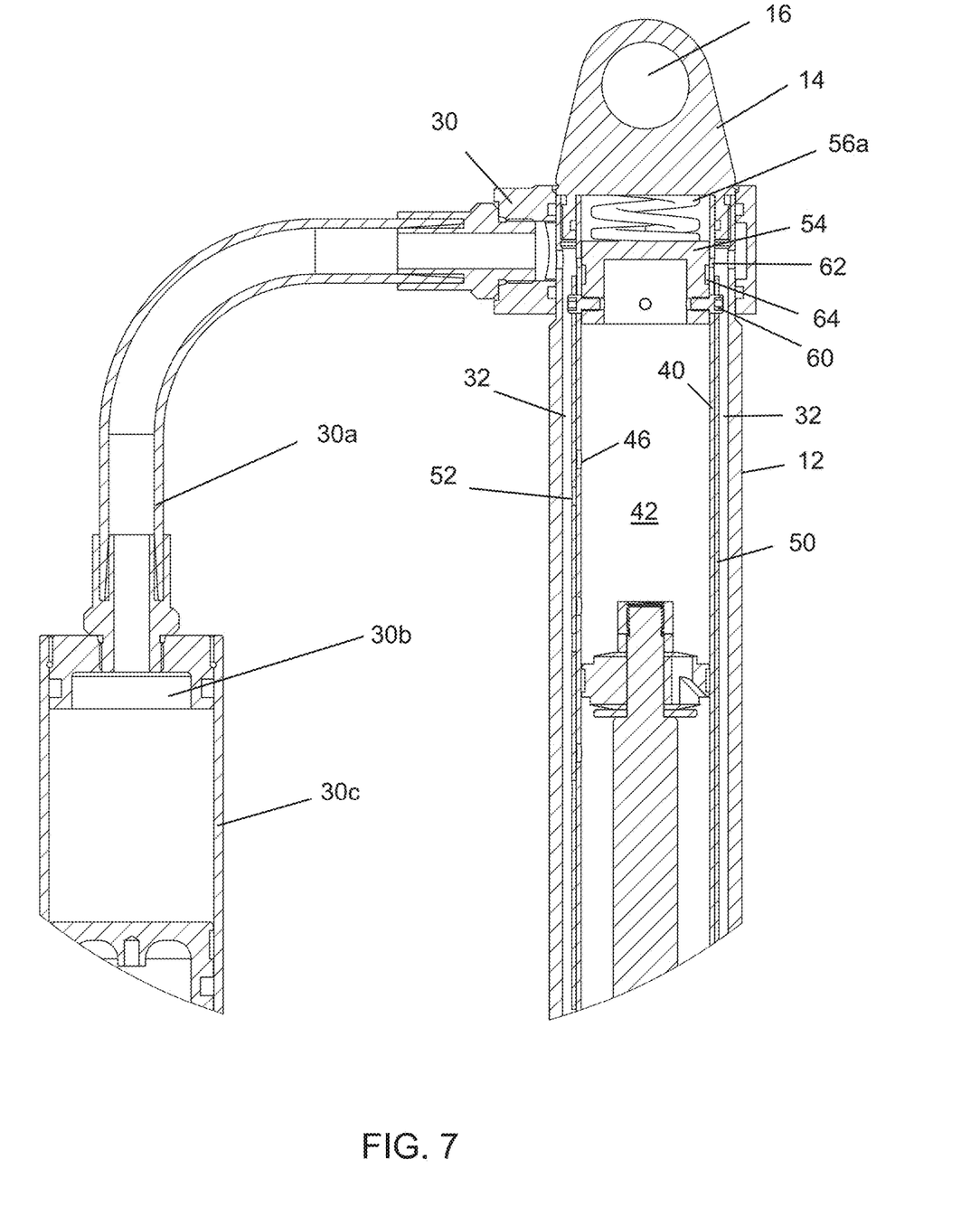
FIG. 7 is a front cross-sectional view of the damper in accordance with a further alternative embodiment of the present invention.

As shown in FIGS. 2, 3, and 4, a reservoir bridge 30 is at the top of the damper 10 to allow damping oil displaced by the shaft 20 to travel into a reservoir 30c (as shown in FIG. 7) through a hose 30a or a passage connected thereto. The reservoir bridge 30 is fluidly connected to an outer passage 32 of the damper 10 inside the outer body 12. The outer passage 32 is substantially cylindrical and is concentric within the cylindrical volume of the outer body 12. With the ordinary function of the damper 10, damping oil flows in and out through the reservoir bridge 30 and into the outer passage 32.

As particularly shown in FIG. 3, an inner body 40 is received and retained within the outer body 12 between the body cap 14 and the rod guide 26. The inner body 40 has a smaller cylindrical diameter than that of the outer body 14 and is received within the cylindrical volume of the outer body 14. The internal portion 24 of the shaft 20 travels up and down in a reciprocating motion inside the inner body 40.

The interior volume of the inner body 40 is filled with the damping oil and defines a cylinder 42 within which the internal portion 24 of the shaft can travel. As shown in FIG. 2, the internal portion 24 of the shaft 20 includes a wear band 44 (or bearing band) to provide a seal to the interior surface of the inner body 40 and force the damping oil through the internal portion 24 of the shaft 20 during travel which provides the damping force. The inner body 40 is formed of a cylindrical tubular member that is fixedly mounted between the rod guide 26 and the body cap 14 in order to prevent free movement during the operation of the damper 10.

As particularly shown in FIG. 2, the inner body 40 has a plurality of bypass ports 46 positioned at various locations along its longitudinal surface. The bypass ports 46 allow oil to pass between the cylinder 42 and the outer passage 32 with the motion of the internal portion 24 of the shaft 20. This reduces the force generated by the internal portion 24 until the internal portion 24 passes a respective port during its travel within the inner body 40. In commonly-available types of shock absorbers that are currently on the market currently, such ports are checked with a flexible metal shim stack that allows the bypass flow in only one direction. However, instead of using such a check shim configuration, the present invention incorporates an outer damping sleeve 50 that is slip fit around an exterior surface of the inner body 40. The outer damping sleeve 50 also includes a plurality of bypass ports 52 that are similarly positioned with the plurality of bypass ports 46 of the inner body 40, so that the outer damping sleeve ports 52 can suitably line up with the bypass ports 46 in the inner body 40.

With reference to FIGS. 3, 4, and 7, the outer damping sleeve 50 is attached to an internal floating piston (IFP) 54 that is received within the inner body 40. The IFP 54 is free to move back and forth within the inner body 40 and is retained at the top of the damper 10 adjacent the body cap 14. The IFP 54 moves back and forth to control the outer damping sleeve 50. Damping oil displaced by the shaft 20 is taken by a reservoir IFP 30b in the reservoir 30c. (As described herein, The IFP 54 is a control IFP that adjusts bypass flow. The inner body 40 is a control inner body, and the outer sleeve 50 is a control sleeve.) The IFP 54 allows the outer damping sleeve 50 to move relative to the inner body 40, dependent on the force applied to the damping system and the subsequent spike in pressure of the damping oil. Adjusting the pressure in the nitrogen chamber 56 (or, generally, the force provided by any type of control spring) allows adjustment of the damping response of the system, by changing the extent to which the IFP 54 moves during a damping event.

With continued reference to FIGS. 3 and 4, the IFP 54 separates the damping oil from a nitrogen chamber 56 that receives a nitrogen charge from a flow passage 58 connected to a Schrader valve for filling the nitrogen chamber 56. The IFP 54 separates damping oil in the outer passage 32 and the cylinder 42 from nitrogen gas within the nitrogen chamber 56.

Figure 8:
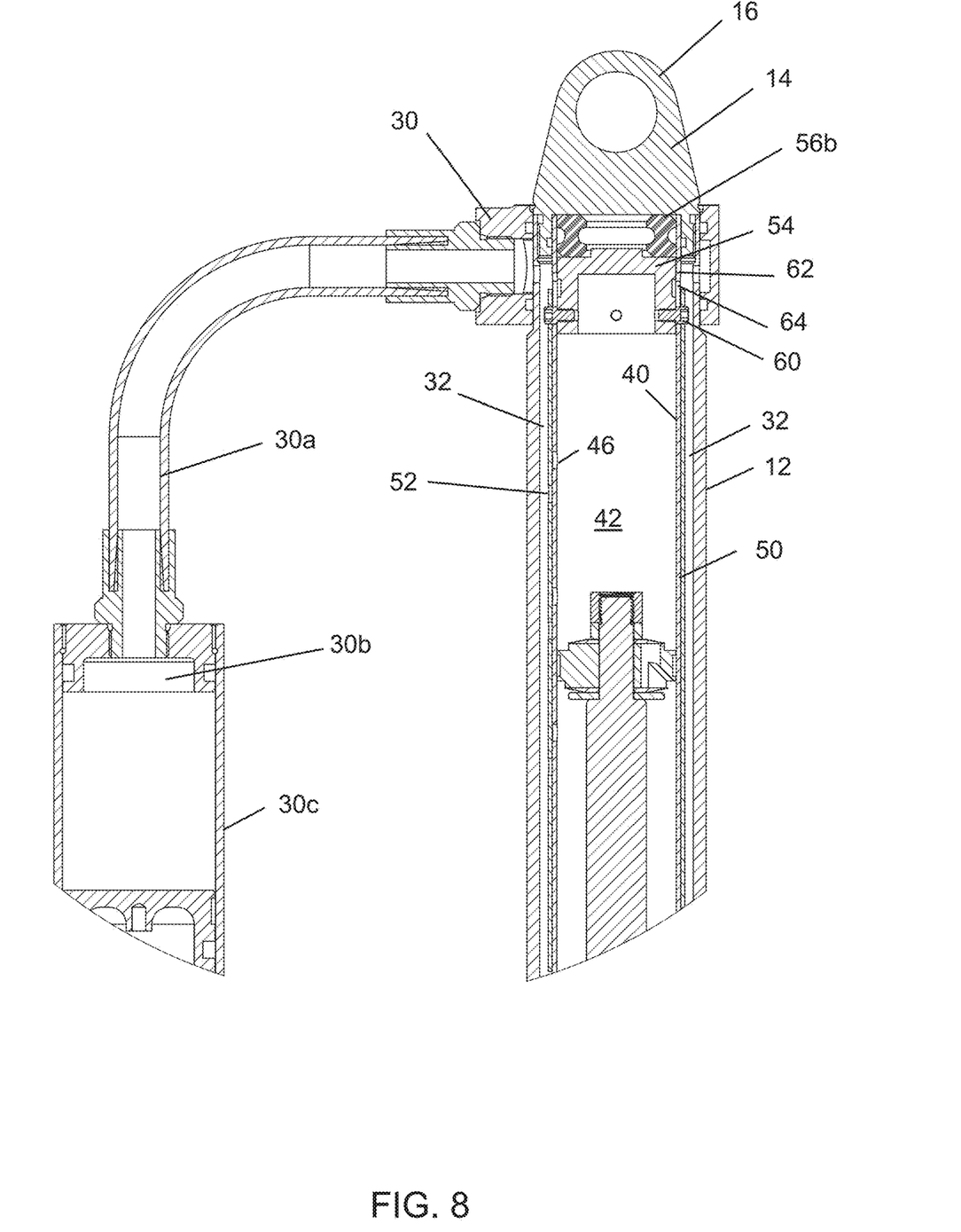
FIG. 8 is a front cross-sectional view of the damper in accordance with a further alternative embodiment of the present invention.

With further continued reference to FIGS. 3 and 4, the pressurized nitrogen gas in the nitrogen chamber 56 functions as an air spring to regulate the damping force. The gas pressure can be externally adjusted at the nitrogen reservoir to selectively vary the spring constant (i.e., the tension of the control spring). However, as shown in the alternate embodiments of FIGS. 7 and 8, where like reference numerals refer to like components, it is to be appreciated that a physical spring 56a, 56b can alternatively be provided instead of the nitrogen chamber 56 to control the sliding motion by applying appropriate pressure to the IFP 54 and therefore controlling movement of the IFP 54. This spring could be a steel/metallic spring 56a (see FIG. 7) or a polymer spring 56b, as would be appreciated by those having skill in the art.

With further reference to FIGS. 3 and 4, the IFP 54 is connected to the outer damping sleeve 50 with a plurality of screws 60. In this manner, the IFP 54 and the outer damping sleeve 50 move together within the damper 10. A pair of channels 62 are formed in the inner body 40 to allow reciprocal movement of the screws 60 within the inner body 40 and thereby allow movement of the IFP 54 and the outer damping sleeve 50 together. Thus, the motion of the outer damping sleeve 50 is regulated by the spring constant associated with the gas pressure in the nitrogen chamber 56, as mentioned hereinabove.

With still further reference to FIGS. 3 and 4, the IFP 54 contains seals and a bearing band 64 to seal the oil in the inner body 40 away from the nitrogen chamber 56 and allow the IFP 54 to travel a given amount (+/−0.25"), though this amount can be varied without departing from the invention. This movement allows the outer damping sleeve 50 to slide back and forth in order to alternately cover or uncover the outer damping sleeve bypass ports 52 from alignment with the inner body bypass ports 46, thereby allowing the damping oil to alternately flow or not flow and thus allowing variable damping control of the damper 10.

In operation of the present damper 10, the internal portion 24 of the shaft 20 is displaced inwardly into the inner body 40 by an automotive wheel encountering a bump in the road. The damping oil in the cylinder 42 compresses against the IFP 54, displacing the IFP 54 into the nitrogen chamber 56. In so doing, the IFP 54 displaces the outer sleeve 50, which brings the outer sleeve bypass ports 52 into or out of alignment with the inner body bypass ports 46. When the bypass ports 46, 52 are aligned, the damping oil flows from the cylinder 42 into the outer passage 32, which lowers the internal oil pressure within the cylinder 42, enabling more rapid movement of the internal portion 24 of the shaft 20. After a first set of bypass ports 46, 52 are passed by the internal portion 24 of the shaft 20, the flow of damping oil into the outer passage 32 is reduced, increasing the internal oil pressure within the cylinder 42, resulting in slower movement of the internal portion 24 of the shaft 20. Thus, the internal pressure within the cylinder 42 is increased as each set of bypass ports 46, 52 are passed by the internal portion 24 of the shaft 20, resulting in increasing slowing of the internal portion 24 as it approaches the end of the cylinder. In this manner, the pressure within the cylinder 42 and thus the speed of the shaft 20 is closely controlled, regulating damping characteristics within the damper 10.

Figure 6:
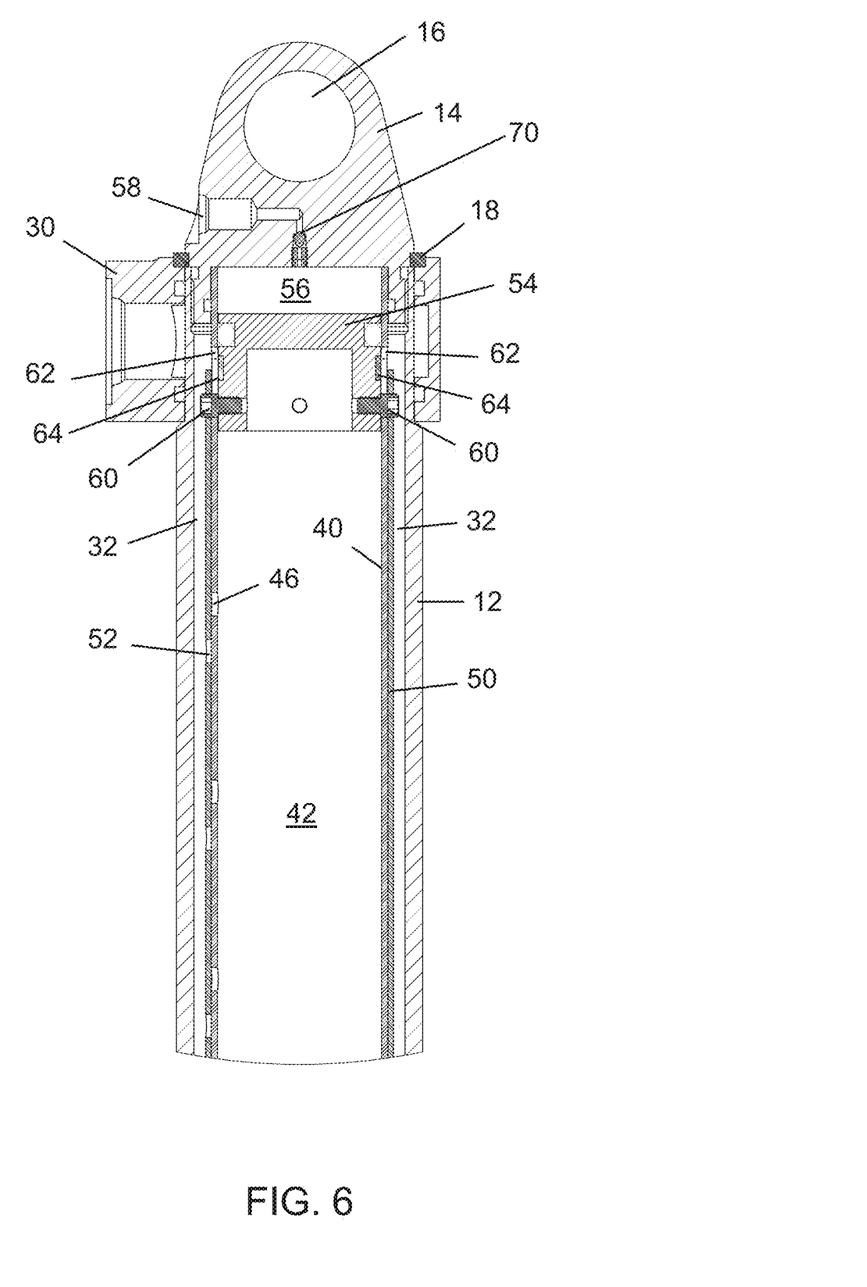
FIG. 6 is a detail view of the front cross-sectional view of the damper for an automotive coil over shock absorber of FIG. 5, shown within the circle B, in accordance with the alternative embodiment of the present invention.

In an alternative embodiment shown in FIG. 6, where like reference numerals also refer to like components, a check valve 70 is installed into the body cap 14 between the nitrogen chamber 56 and a fill valve (not shown) of the nitrogen chamber beyond the flow passage 58. The check valve 70 includes a threaded cavity and tapered seat machined into the body cap 14, also including a hardened steel check ball, and a vented, castled set screw. When the IFP 54 is forced to move, the check ball is forced against the tapered seat, effectively closing the nitrogen chamber 56 off from the port leading to the fill valve. This effectively minimizes the size of nitrogen chamber 56, increasing the rate at which pressure builds in the chamber during a damping event. This allows a lower resting nitrogen pressure to provide higher resistance to motion to the IFP 54, increasing reliability of the system. The castling of the vented set screw allows nitrogen to be added to the chamber 56 during filling without impedance. It is important to note that the seal between the tapered seat and the check ball must be imperfect so as to allow depressurization of nitrogen chamber 56; the metal-on-metal nature of the seal between the check ball and the tapered seat is sufficient for this purpose while still effectively choking flow into the fill valve port during a damping event.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A damper for use with an automotive coil over shock absorber, the damper comprising:
    an outer body having a first end and a second end for receiving and retaining damping oil to absorb energy during a damping event;
    a body cap for enclosing and sealing the first end of the outer body and for attaching to a chassis of a vehicle;
    a shaft for reciprocating travel, the shaft including; a distal end having an eyelet for attaching to a suspension component of the vehicle; and a proximal end, opposite the distal end, formed as an internal portion of the shaft received within the outer body;
    a rod guide retained at the second end of the outer body for containing the damping oil within the damper while allowing the reciprocating travel of the internal portion of the shaft;
    an inner body, fixedly retained within the outer body, for receiving the internal portion of the shaft, the inner body including: an interior volume filled with the damping oil for retaining the internal portion of the shaft during the reciprocating travel; and an exterior surface defining an outer passage between the inner body and the outer body, the inner body having a plurality of first bypass ports at predetermined positions around the exterior surface to permit flow of the damping oil between the interior volume and the outer passage in response to the reciprocating travel of the shaft;
    an outer damping sleeve retained over the exterior surface of the inner body and including a plurality of second bypass ports at predetermined positions to alternately align and unalign with the plurality of first bypass ports of the inner body, to alternately allow or not allow a bypass flow of the damping oil between the interior volume and the outer passage when aligned, thereby allowing variable damping control of the damper; and
    an internal floating piston that is received within the inner body for free movement therein and fixedly attached to the outer damping sleeve, and retained proximate to the first end of the outer body adjacent to the body cap, wherein the internal floating piston is configured to move relative to the inner body, to control alignment of the second bypass ports of the outer damping sleeve with the first bypass ports of the inner body dependent on a force applied to the damper during the damping event.

2. The damper of claim 1, further comprising a control spring, retained proximate to the body cap, for applying a force to the internal floating piston to limit the free movement of the internal floating piston and thereby control a damping force of the damper during the damping event.

3. The damper of claim 2, wherein the control spring comprises a nitrogen chamber for receiving pressurized nitrogen gas that functions as an air spring to regulate the damping force, wherein pressure of the pressurized nitrogen gas is externally adjustable to selectively vary a spring constant within the nitrogen chamber.

4. The damper of claim 3, further comprising a check valve in the body cap between the nitrogen chamber and a flow passage for supplying the pressurized nitrogen gas, wherein the check valve comprises a check ball that is forced into a seat upon movement of the internal floating piston, thereby increasing a rate of pressure buildup in the nitrogen chamber during a damping event.

5. The damper of claim 2, wherein the control spring comprises at least one of a steel/metallic spring or a polymer spring.

6. The damper of claim 1, further comprising a reservoir bridge fluidly connected to the outer passage for allowing damping oil displaced by the shaft to flow into a reservoir through a passage connected thereto, such that damping oil flows in and out of the outer passage through the reservoir bridge.

7. The damper of claim 1, wherein the outer body, inner body, outer damping sleeve and outer passage are substantially cylindrical and concentric.

8. The damper of claim 7, wherein the inner body has a smaller cylindrical diameter than that of the outer body so as to be received within a cylindrical volume of the outer body.

9. The damper of claim 8, wherein the interior volume of the inner body is a cylinder.

10. The damper of claim 8, wherein the inner body is formed of a cylindrical tubular member that is fixedly mounted between the rod guide and the body cap in order to prevent free movement during damper operation.

11. The damper of claim 1, wherein the internal portion of the shaft includes a wear band to provide a seal to the interior surface of the inner body during the reciprocating travel.

12. The damper of claim 1, wherein the rod guide comprises an O-ring and a flange seal.

13. The damper of claim 1, wherein the internal floating piston and the outer damping sleeve are connected with at least one screw, and wherein the inner body further comprises at least one channel to respectively allow reciprocal movement of the at least one screw within the inner body and thereby allow movement of the internal floating piston and the outer damping sleeve together.

14. A damper for use with an automotive coil over shock absorber, the damper comprising:
    an outer body having a first end and a second end for receiving and retaining damping oil to absorb energy during a damping event;
    a shaft for reciprocating travel, the shaft including an internal portion received within the outer body;
    an inner body, fixedly retained within the outer body, for receiving the internal portion of the shaft, the inner body including: an interior volume filled with the damping oil for retaining the internal portion of the shaft during the reciprocating travel; and an exterior surface defining an outer passage between the inner body and the outer body, the inner body having a plurality of first bypass ports at predetermined positions around the exterior surface to permit flow of the damping oil between the interior volume and the outer passage in response to the reciprocating travel of the shaft;
    an outer damping sleeve retained over the exterior surface of the inner body and including a plurality of second bypass ports at predetermined positions to alternately align and unalign with the plurality of first bypass ports of the inner body to alternately allow or not allow a bypass flow of the damping oil between the interior volume and the outer passage when aligned, thereby allowing variable damping control of the damper;

an internal floating piston that is received within the inner body for free movement therein and fixedly attached to the outer damping sleeve, and retained proximate to the first end of the outer body, wherein the internal floating piston is configured to move relative to the inner body, to control alignment of the second bypass ports of the outer damping sleeve with the first bypass ports of the inner body dependent on a force applied to the damper during the damping event; and a nitrogen chamber for receiving pressurized nitrogen gas that functions as an air spring for applying a force to the internal floating piston to limit the free movement of the internal floating piston and thereby control a damping force of the damper during the damping event.

15. The damper of claim 14, wherein pressure of the pressurized nitrogen gas is externally adjustable to selectively vary a spring constant of the pressurized nitrogen gas within the nitrogen chamber.

16. The damper of claim 14, further comprising a check valve between the nitrogen chamber and a flow passage for supplying the pressurized nitrogen gas, wherein the check valve comprises a check ball that is forced into a seat upon movement of the internal floating piston, thereby increasing a rate of pressure buildup in the nitrogen chamber during a damping event.

* * * * *